United States Patent
Destarac et al.

(10) Patent No.: US 7,317,050 B2
(45) Date of Patent: Jan. 8, 2008

(54) CONTROLLED MINI-EMULSION FREE RADICAL POLYMERIZATION

(75) Inventors: Mathias Destarac, Paris (FR); Wojciech Bzducha, Courbevoie (FR)

(73) Assignee: Rhodia Chimie, Aubervilliers (FR)

(*) Notice: Subject to any disclaimer, the term of this patent is extended or adjusted under 35 U.S.C. 154(b) by 470 days.

(21) Appl. No.: 10/482,330

(22) PCT Filed: Jun. 26, 2002

(86) PCT No.: PCT/FR02/02219

§ 371 (c)(1),
(2), (4) Date: Dec. 29, 2003

(87) PCT Pub. No.: WO03/002614

PCT Pub. Date: Jan. 9, 2003

(65) Prior Publication Data

US 2004/0192838 A1    Sep. 30, 2004

(30) Foreign Application Priority Data

Jun. 29, 2001  (FR) .................................. 01 08683

(51) Int. Cl.
*C08F 2/22*   (2006.01)

(52) U.S. Cl. .................. 524/819; 523/201; 526/222

(58) Field of Classification Search ............... 524/819; 523/201

See application file for complete search history.

(56) References Cited

U.S. PATENT DOCUMENTS

| | | | | |
|---|---|---|---|---|
| 5,852,135 A | * | 12/1998 | Kanai et al. ................. | 525/398 |
| 6,410,666 B1 | * | 6/2002 | Grubbs et al. ............... | 526/171 |
| 6,642,318 B1 | * | 11/2003 | Chiefari et al. ............. | 525/261 |
| 6,777,513 B1 | * | 8/2004 | Destarac et al. ............ | 526/222 |
| 7,012,114 B2 | * | 3/2006 | Bett et al. ................... | 524/458 |

FOREIGN PATENT DOCUMENTS

| | | |
|---|---|---|
| DE | 19920353 A1 * | 11/2000 |
| FR | 2 794 463 A | 12/2000 |
| WO | WO 98 01478 A | 1/1998 |

\* cited by examiner

*Primary Examiner*—Tae H Yoon
(74) *Attorney, Agent, or Firm*—Buchanan, Ingersoll & Rooney, PC

(57) ABSTRACT

The invention concerns a method for preparing polymers by free radical polymerisation comprising (i) preparing a mini-emulsion containing: at least an ethylenically unsaturated monomer, at least a control agent selected among xanthates, dithio-carbamates, thioether-thiones, the xanthates comprising phosphorus and optionally fluorine and dithiophosphoroesters, an aqueous solution, a surfactant, and a co-surfacant, and (ii) reacting said mini-emulsion, in the presence of a free radical source, at a sufficient temperature and/or for a sufficient time interval to form the polymers.

16 Claims, No Drawings

CONTROLLED MINI-EMULSION FREE RADICAL POLYMERIZATION

The present invention relates to a novel process for miniemulsion radical polymerization providing access to polymers possessing reactivateable chain ends which can be used in particular for the preparation of block copolymers.

Emulsion polymerization is currently the most advanced polymerization process industrially. Mention may be made, among the most well-known products, of styrene-butadiene copolymers, vinyl acetate and acrylic latexes.

A standard emulsion free radical polymerization process involves the following compounds: water, a monomer or a mixture of monomers, at least one surfactant, an initiator and optionally polymerization additives (transfer agents, salts). In outline, the monomers are distributed in the following way:

very predominantly in the form of droplets dispersed in the aqueous phase and stabilized by the surfactant,
at the core of surfactant micelles,
soluble, at a low concentration, in the aqueous phase.

The reaction begins by the creation of radicals in the aqueous phase resulting from the decomposition of the water-soluble initiator. These radicals initiate chains which propagate in the aqueous phase until a critical size is reached, at which these chains precipitate and nucleate a particle. The very low specific surface of the droplets, combined with their number, renders their nucleation improbable in comparison with that of the micelles. Nucleation takes place very predominantly in swollen micelles of the monomers, which are nucleated to give particles of polymers. The supplying of the particles with monomers is therefore provided by the droplets, which act as a reservoir of monomers which diffuses toward the polymerization sites.

Ugelstad has demonstrated (Ugelstad et al., Journal of Polymer Science, Polym. Letter Ed., 111, 503 (1973)) that, when the droplets of monomers are prepared by a miniemulsification process to produce droplets of submicron size, the nucleation of the droplets may no longer be neglected. Below a certain size of droplets, this mechanism becomes predominant, to become the only mechanism if the splitting of the droplets becomes sufficiently great. Ideally, in the absence of any subsidiary nucleation, this means that the number and the size of the particles are identical to those of the starting droplets. This scenario can introduce a number of advantages. First of all, the distributions in size of particles are generally broad, which makes it possible to envisage the preparation of latexes possessing very high levels of solids (greater levels than the conventional emulsion process—Masa et al., J. Appl. Polym. Sci., 48, 205 (1993)). It has also been demonstrated that the miniemulsion has a distinct advantage in controlling the size of the particles during polymerization processes in CSTR (Continuous Stirred Tank Reactors) reactors (Aizpurua et al., Macromol. Symp., 111, 121 (1996)).

Specific radical polymerization processes have recently been developed in which the polymer chains produced are functionalized by end groups capable of being able to be reactivated in the form of free radicals by virtue of reversible transfer or termination reactions.

This type of specific radical polymerization is generally denoted by the term of "controlled" or "living" radical polymerization. These names originate from the fact that the presence of the reactivateable end groups described above brings about the existence of equilibria between functionalized entities (known as "dormant" entities) and active entities (free radicals), which makes it possible both to control the growth of the polymer chains (acquisition of narrow distributions in the masses and control of the average molecular mass, in particular by varying the monomer/precursor of active chains molar ratio) and to obtain functionalized polymers, known as "living" polymers, capable of being employed as reactivateable entities in subsequent radical polymerization reactions, which proves to be particularly advantageous in the context of the preparation of block copolymers.

The controlled radical polymerization can make it possible to exhibit the following distinct aspects:
1. the number of chains is unchanging throughout the duration of the reaction,
2. the chains all grow at the same rate, which is reflected by:
    a linear increase in the molecular masses with the conversion,
    a narrow distribution in the masses,
3. the average molecular mass is controlled by the monomer/chain precursor molar ratio,
4. the possibility of preparing block copolymers.

The controlled nature becomes more pronounced as the rate of reactivation of the chains to radicals becomes greater in comparison with the rate of growth of the chains (propagation). Cases exist where this is not always true (i.e. the rate of reactivation of the chains to radicals is less than the rate of propagation) and conditions 1 and 2 are not observed. Nevertheless, it is still possible to prepare block copolymers.

Recently, processes for living radical polymerization by reversible addition-fragmentation transfer have been developed. This specific type of polymerization constitutes one of the most appropriate technologies for synthesizing block copolymers by the radical route. In this context, patent applications WO 98/01478, on behalf of Dupont de Nemours, and WO 99/35178, on behalf of Rhodia Chimie, disclose, for example, the use of control agents of dithioester type of RS(C=S)R' type for the synthesis of controlled-architecture copolymers. The control of radical polymerizations by dithiocarbamates of type RS(C=S)NR'R" has also recently been disclosed in patent applications WO 99/35177 on behalf of Rhodia Chimie and WO 99/31144 on behalf of Dupont de Nemours. In the context of the living radical polymerization, xanthates of general formula RSC(=S)OR', disclosed, for example, in patent application WO 98/58974 on behalf of Rhodia Chimie, are particularly advantageous reversible transfer agents which make it possible to control the radical polymerization of a large number of monomers, such as styrene, acrylic, acrylamide, vinyl ester and diene monomers.

In a conventional emulsion, the agents for control via a reversible termination reaction, such as the nitroxide precursors according to the teaching of patent application WO 99/03894 or the organometallic complex in the oxidized state in ATRP (Atom Transfer Radical Polymerization) technology according to the teaching of application WO 96/30421, can be distributed between the organic phase and the aqueous medium. If an excessively high proportion of deactivator is present in the aqueous phase, reversible termination reactions take place at this spot. The main consequence is a decrease in the polymerization rate. A lack of control agent in the effective polymerization site, namely the particles, brings about a loss in control of the reaction. The main result of this is a broadening in the molecular mass distribution. Furthermore, from a kinetic view point, the nitroxide and ATRP technologies are unfavorable in a dispersed medium approach. Very slow polymerizations result therefrom.

The nitroxide technology was employed in a conventional emulsion (Lansalot et al., ACS Polymer Preprints, Division of Polymer Chemistry, 40 (2), 317 (1999)) and in a miniemulsion (Xerox Corporation patent U.S. Pat. No. 6,121, 397). The major disadvantage of this family of agents is their application in a dispersed medium to a very limited number of monomers, mainly styrene and dienes.

In the case of ATRP, the distribution of the catalyst between the aqueous phase and the organic phase is mainly determined by the nature of the ligand. It has been demonstrated that the ligand has to be sufficiently hydrophobic to introduce a minimum of catalyst into the organic phase. However, conversely, if the complex becomes too hydrophobic, the diffusion of the catalyst through the aqueous phase becomes too slow, which has the effect of detrimentally affecting the quality of the control of the polymerization. To keep the copper-based catalyst in the particles, Matyjaszewski et al., (Journal of Polymer Science, vol. 38, 4724 (2000)) have had a miniemulsion approach. A major disadvantage of this system is the fact of being able to use solely nonionic surfactants, moreover in a very large amount (more than 10% with respect to the monomers in the conventional procedures).

Systems based on reversible transfer are more favorable, on the one hand kinetically but in particular because of the creation of control macroagents (chains of polymers), once the first transfer reaction has been carried out between the initial control agent and a radical growing in the organic phase. This situation prevents any departure of the control agent thus created from the particle.

However, several disadvantages of these techniques could be detected in a conventional emulsion. This is the case when the control agent diffuses more slowly into the aqueous phase than the monomer. This generally results in poorly controlled number-average molecular masses Mn and high polydispersity indices. Mention may thus be made in particular of Lansalot et al., Macromolecules, 32, 7354 (1999), for the use of $C_6F_{13}I$ as reversible transfer agent in the emulsion polymerization of styrene. A miniemulsion use has been introduced in order to circumvent this difficulty.

Another well-known system is thus reversible addition-fragmentation transfer. One of the families of control agents coming within this category is that of the dithioesters RS(C=S)R', as indicated above. Because of their very high transfer constant, dithioesters RS(C=S)R' possessing a tertiary R leaving group are entirely ineffective as reversible addition-fragmentation agents in conventional emulsion polymerization (Hans de Brouwer et al., Macromolecules, 2000, 33, 9239). They are only active in a miniemulsion in the presence of exclusively nonionic surfactant, in an amount of greater than 10% generally, which greatly restricts the potential of use of such systems. Examples of living polymerization synthesis in a miniemulsion have been given in patent application WO 98/01478 in the presence of benzyl dithiobenzoate as control agent; however, only the synthesis of polystyrene, thus of homopolymers, is described therein.

One aim of the present invention is thus to provide a novel process employed in a miniemulsion which makes it possible to obtain high yields of polymers.

A second aim of the invention is to provide a process for the synthesis by radical polymerization of block polymers, in particular of triblock polymers, with a lower polydispersity index than for a standard emulsion process employing the same reactants.

A third aim is to provide a radical polymerization process which is easy and inexpensive to implement.

These aims and others which will become apparent in the continuation of the description are achieved by the present invention, which relates to a process for the preparation of polymers by radical polymerization which comprises (i) the preparation of a miniemulsion comprising:
- at least one ethylenically unsaturated monomer,
- at least one control agent selected from xanthates, dithiocarbamates, thioether-thiones, xanthates comprising phosphorus and optionally fluorine and dithiophosphoric acid esters,
- an aqueous solution,
- a surfactant,
- and a cosurfactant, and (ii) the reaction of said miniemulsion, in the presence of a source of free radicals, at a sufficient temperature and/or for a sufficient time to form polymers.

The process according to the invention exhibits the advantage of being able to easily and efficiently prepare triblock polymers in a dispersed medium.

It also exhibits the advantage of making it possible to obtain relatively high solid contents (from 10 to 65%, preferably from 30% to 50%, by weight).

In the present description, and in the absence of contrary indications, the term "polymer" will be used to denote, within the broad sense, both homopolymers and copolymers.

Furthermore, within the meaning of the invention, the term "block copolymer" is understood to mean a copolymer comprising at least two successive sequences (blocks) of monomer units with different chemical constitutions. Each of the blocks present can be composed of a homopolymer or of a copolymer obtained from a mixture of ethylenically unsaturated monomers. In the second case, the block can in particular be a random copolymer. The block copolymers within the meaning of the invention can thus comprise two blocks each composed of random copolymers. In this case, the ethylenically unsaturated monomers are such that the blocks obtained are of different natures. The term "blocks of different natures" is understood to mean either blocks composed of monomers of different types or blocks composed of monomers of the same type but in different amounts.

Mention may in particular be made, among control agents which can thus be used to prepare the polymer or polymers, of reversible addition-fragmentation agents of xanthates type RSC=SOR', such as described in patent applications WO 98/58974 and WO 00/75207, dithiocarbamates of formula $RS(C=S)NR_1R_2$, such as those described in patent applications WO 99/35177 and WO 99/31144, or thioether-thione compounds, such as those described in patent application FR 2 794 464.

Mention may also be made of compounds of the family of the xanthates comprising phosphorus and optionally fluorine, such as those described in French patent application No. 2 802 208, filed by the Applicant Company.

Mention may additionally be made of dithiophosphoric acid ester compounds, such as those of general formula (B) which were described in French patent application No. 00/09952, filed by the Applicant Company:

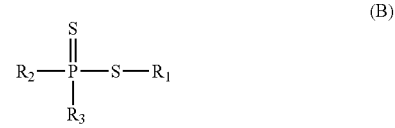

in which:
R₁ represents:
an optionally substituted alkyl, acyl, aryl, aralkyl, alkene or alkyne group, an optionally substituted, saturated, unsaturated or aromatic, carbonaceous ring or heterocycle,
a polymer chain,
$R_2$ and $R_3$, which are identical or different, represent:
a hydrogen atom,
—S—$R_1$,
an optionally substituted alkyl, acyl, aryl, aralkyl or alkyne radical,
an optionally substituted, saturated, unsaturated or aromatic, carbonaceous ring or heterocycle,
$R_2$ and $R_3$ can together represent the atoms necessary to form an optionally substituted, saturated, unsaturated or aromatic, carbonaceous ring or heterocycle, and
p is between 2 and 10.

The $R_1$, $R_2$ and $R_3$ groups, when they are substituted, can be substituted by substituted phenyl groups, substituted aromatic groups, saturated or unsaturated carbonaceous rings, saturated or unsaturated heterocycles, or groups: alkoxycarbonyl or aryloxycarbonyl (—COOR), carboxyl (—COOH), acyloxy (—$O_2CR$), carbamoyl (—$CONR_2$), cyano (—CN), alkylcarbonyl, alkylarylcarbonyl, arylcarbonyl, arylalkycarbonyl, phthalimido, maleimido, succinimido, amidino, guanidino, hydroxyl (—OH), amino (—$NR_2$), halogen, perfluoroalkyl $C_nF_{2n+1}$, allyl, epoxy, alkoxy (—OR), S-alkyl, S-aryl, groups exhibiting a hydrophilic or ionic nature, such as alkaline salts of carboxylic acids, alkaline salts of sulfonic acid, poly(alkylene oxide) (PEO, PPO) chains, cationic substituents (quaternary ammonium salts), R representing an alkyl or aryl group, or a polymer chain.

According to a specific embodiment, R1 is a substituted or unsubstituted, preferably substituted, alkyl group.

The compounds of formula (B) of use as control agents for preparing first generation polymers are, for example, the compounds in which $R_1$ is selected from:
—$CH_2C_6H_5$
—$CH(CH_3)(CO_2Et)$
—$CH(CH_3)(C_6H_5)$
—$CH(CO_2Et)_2$
—$C(CH_3)(CO_2Et)$ (S—$C_6H_5$)
—$C(CH_3)_2(C_6H_5)$
—$C(CH_3)_2CN$

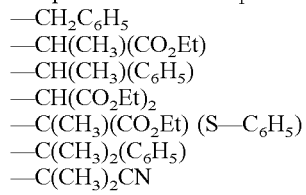

in which Et represents an ethyl group and Ph represents a phenyl group.

The compounds of formula (B) are readily accessible. They can in particular be obtained by reaction between $P_4S_{10}$, $K_2CO_3$ and a halogenated derivative (Nizamov et al., *Phosphorus, Sulfur and Silicon*, vol. 132, 85-100 (1998)). Another access route consists in reacting an alkali metal salt of a dithiophosphonic acid with a halogenated derivative (Mastryukova et al., *Bull. Acad. Sci. USSR. Div. Chem. Sci. (Engl Transl)*, vol. 27, 1917 (1978)).

The optionally substituted alkyl, acyl, aryl, aralkyl or alkyne groups generally exhibit 1 to 20 carbon atoms, preferably 1 to 12 and more preferably 1 to 9 carbon atoms. They can be linear or branched. They can also be substituted by oxygen atoms, in the form in particular of esters, or sulfur or nitrogen atoms.

Mention may in particular be made, among alkyl radicals, of the methyl, ethyl, propyl, butyl, pentyl, isopropyl, tert-butyl, pentyl, hexyl, octyl, decyl or dodecyl radical.

The alkyne groups are radicals generally of 2 to 10 carbon atoms; they exhibit at least one acetylenic unsaturation, such as the acetylenyl radical.

The acyl group is a radical generally exhibiting from 1 to 20 carbon atoms with a carbonyl group.

Mention may in particular be made, among aryl radicals, of the phenyl radical, optionally substituted in particular by a nitro or hydroxyl functional group.

Mention may in particular be made, among aralkyl radicals, of the benzyl or phenethyl radical, optionally substituted in particular by a nitro or hydroxyl functional group.

When R is a polymer chain, this polymer chain can result from a radical or ionic polymerization or from a polycondensation.

In the context of the present invention, preference is given to the following control agents: xanthate compounds, dithiocarbamate compounds and compounds of general formula (B).

Use is advantageously made, as control agent, of xanthate compounds.

The process of the invention is carried out in the presence of a source of free radicals (initiator). However, for some monomers, such as styrene, the free radicals which make it possible to initiate the polymerization can be generated by the monomer possessing ethylenic unsaturation, itself at sufficiently high temperatures generally of greater than 100° C. It is not, in this case, necessary to add a source of additional free radicals.

The source of free radicals can be introduced into the miniemulsion or before the formation of the miniemulsion.

The source of free radicals which is of use in the process of the present invention is generally a radical polymerization initiator. The radical polymerization initiator can be selected from the initiators conventionally used in radical polymerization. It can, for example, be one of the following initiators:

hydrogen peroxides, such as, in particular: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate, azo compounds, such as, in particular: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine dichloride), 2,2'-azobis(2-amidinopropane dichloride), 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide] or 2,2'-azobis(isobutyramide) dihydrate, redox systems comprising combinations, such as, in particular:

mixtures of hydrogen peroxide, alkyl peroxide, peresters, percarbonates and the like and of any iron salts or titanous salts, zinc formaldehydesulfoxylate or sodium formaldehydesulfoxylate, and reducing sugars, alkali metal or ammonium persulfates, perborates or perchlorates in combination with an alkali metal bisulfite, such as sodium metabisulfite, and reducing sugars, alkali metal persulfates in combination with an arylphosphinic acid, such as benzenephosphonic acid, and other similar compounds, and reducing sugars.

According to one embodiment, the amount of initiator to be used is determined so that the amount of radicals generated is at most 50 mol %, preferably at most 20 mol %, with respect to the amount of the control agent. In this case, the control agent corresponds to a functional definition. Thus, it corresponds to the control agents present but also to the compounds present which exhibit the active part of a control agent (for example, the active part of RSC=SOR' corresponds to —SC=SOR').

The ethylenically unsaturated monomers of use in the process of the present invention are advantageously substantially water-insoluble monomers and generally exhibit a following general formula (I):

CXX'(=CV—CV')$_b$=CH$_2$, in which:

V and V', which are identical or different, represent: H, an alkyl group or a halogen, X and X', which are identical or different, represent H, a halogen or an R, OR, O$_2$COR, NHCOH, OH, NH$_2$, NHR, N(R)$_2$, (R)$_2$N$^+$O$^-$, NHCOR, CO$_2$H, CO$_2$R, CN, CONH$_2$, CONHR or CON(R)$_2$ group, in which R is selected from alkyl, aryl, aralkyl, alkylaryl, alkene or organosilyl groups which are optionally perfluorated and optionally substituted by one or more carboxyl, epoxy, hydroxyl, alkoxy, amino, halogen or sulfo groups, and b is 0 or 1.

The substantially water-insoluble monomers are preferably monomers which exhibit a solubility in water of 0 to 5% by weight, advantageously of 1 to 3% by weight.

The ethylenically unsaturated monomers can be chosen in particular from:

vinylaromatic monomers, such as styrene and styrene derivatives, such as α-methylstyrene or vinyltoluene, ethylenic monomers, such as ethylene, α-olefins or vinyl chloride, dienes, such as butadiene, isoprene or chloroprene, alkyl acrylates and methacrylates, the alkyl group of which comprises from 1 to 10 carbon atoms, such as methyl, ethyl, n-butyl, 2-ethylhexyl, t-butyl, isobornyl, phenyl or benzyl acrylates and methacrylates, and fluorinated monomers, vinyl monomers, such as vinyl acetate, vinyl versatate or vinyl propionate, and nitriles, more particularly those comprising from 3 to 12 carbon atoms, such as acrylonitrile and methacrylonitrile.

Use is preferably made of the following monomers:

styrene and styrene derivatives, such as α-methylstyrene or vinyltoluene, vinyl nitriles, dienes, for example butadiene or isoprene.

The term "(meth)acrylic esters" denotes esters of acrylic acid or of methacrylic acid with hydrogenated or fluorinated C$_1$-C$_{12}$ alcohols, preferably with C$_1$-C$_8$ alcohols. Mention may be made, among the compounds of this type, of: methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate or isobutyl methacrylate.

The vinyl nitriles include more particularly those having from 3 to 12 carbon atoms, such as, in particular, acrylonitrile and methacrylonitrile.

For the preparation of poly(vinyl alcohol) blocks, use is preferably made, as ethylenically unsaturated monomers, of carboxylic acid vinyl esters, such as, for example, vinyl acetate. The polymer obtained is then hydrolyzed at an acidic or basic pH.

The types and amounts of polymerizable monomers employed according to the present invention vary according to the specific final application for which the polymer is intended. These variations are well known and can be easily determined by a person skilled in the art.

These ethylenically unsaturated monomers can be used alone or as a mixture.

According to a specific embodiment, in the process for the preparation of a first generation polymer, if the ethylenically unsaturated monomer corresponds to the formula (I): CXX' (=CV—CV')$_b$=CH$_2$, the first generation polymer obtained comprises n times the unit of formula (II):

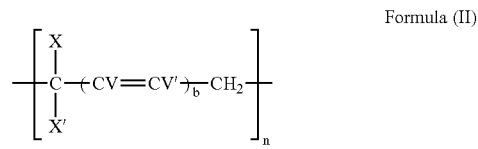

Formula (II)

with n is greater than or equal to 1, preferably greater than 6,
V, V', X, X' and b being as defined above.

The surfactants which can be used in the context of the present invention comprise the anionic, cationic, amphoteric and nonionic emulsifiers commonly used in emulsion polymerization processes. They can be used alone or as a mixture. A list of the surfactants which can be used in the context of the present invention can be found in "McCutcheon's Emulsifiers and Detergents 1981 Annuals".

Use is preferably made of anionic surfactants. Mention may in particular be made, among the latter, of alkylarylsulfonates, such as sodium dodecylbenzenesulfonate, alkali metal alkyl sulfates, such as sodium dodecyl sulfate (SDS), sulfonated alkyl esters, fatty acid esters or fatty acid salts, such as sodium stearate.

The surfactants can be employed in variable amounts which make it possible to obtain a miniemulsification. To give an order of magnitude, the surfactants can be present in an amount of between approximately 0.02 and 8.0% by weight, preferably between 0.3 and 5% by weight, with respect to the total weight of ethylenically unsaturated monomers present.

The cosurfactants make it possible to increase the stability of the miniemulsion by minimizing the effects of Ostwald ripening.

These cosurfactants are generally substantially water-insoluble compounds, such as long-chain C$_{10}$-C$_{40}$ hydrocarbonaceous compounds selected from alcohols, alkanes, mercaptans, carboxylic acids, ketones, amines and their mixtures. Mention may thus be made of hexadecane or cetyl alcohol. Use may also be made of polymeric cosurfactants and more specifically of polymers (homopolymers or random, block or grafted copolymers) which are substantially insoluble in water but soluble in the monomer or the mixture of monomers used in the process according to the invention. Mention may thus be made of polymers based on poly (methyl methacrylate), polystyrene, poly(vinyl acetate), poly(methyl acrylate) and poly(ethyl acrylate). Mention may in particular be made, as example of block copolymers, of polystyrene-polybutadiene-polystyrene and polystyrene-polyisoprene. Mention may also be made of polymers possessing active ends (active part of a control agent) obtained according to a "living" or "controlled" radical polymerization method, such as described in particular in patent applications WO 98/58974, WO 98/01478, WO 99/35178, WO 99/35177, WO 99/31144 and FR 2 802 208. Mention may also be made of silicone polymers possessing xanthate active ends, such as described in French patent application No. 009722, filed by the Applicant Company.

The number-average molecular mass (Mn) of the cosurfactant, when the latter is a polymer, is preferably between 10 000 and 1 000 000, preferably between 50 000 and 250 000 g/mol.

The amount by weight of cosurfactants with respect to the ethylenically unsaturated monomer according to the process is advantageously between 0.01 and 5%, preferably between 0.1 and 2%. The molar ratio of cosurfactants to surfactant is advantageously between 0.001 and 10, preferably between 0.5 and 5.

More particularly, the amount of surfactants and optionally of cosurfactants is between 0.4 and 2% by weight with respect to the total weight of ethylenically unsaturated monomers present.

The aqueous solution of the process according to the invention thus comprises generally demineralized water. According to this process, the amount of water introduced can advantageously be relatively low. It can thus be such that the amount of dry matter at the end of the process according to the invention is between 10 and 65% by weight, preferably between 30 and 55%, with respect to the total weight of the miniemulsion.

A miniemulsion is thus a finely divided oil-in-water emulsion. More specifically, the mean diameter of the droplets corresponding to the dispersed phase is between 10 and 500 nm. It can be prepared according to numerous methods. It is preferably obtained by subjecting to ultrasound or by shearing the emulsion comprising the compounds specified according to the present invention.

The process is preferably carried out semicontinuously.

In general, during the polymerization, the instantaneous content of polymer with respect to the instantaneous amount of monomer and polymer is between 50 and 99% by weight, preferably between 75 and 99%, or preferably still between 90 and 99%. This content is maintained, in a known way, by controlling the temperature and the rate of addition of the reactants and optionally of the polymerization initiator.

The process is generally carried out in the absence of a UV source by thermal initiation.

Thus, the temperature of the reaction (ii) can vary between 40° C. and 200° C. depending on the nature of the monomers used. It is preferably between 60 and 120° C.

The pressure is generally in practice atmospheric pressure but can be higher.

Advantageously, once the reaction (ii) is definitely complete, (iii) the miniemulsion is cooled to ambient temperature, (iv) the polymer obtained is optionally isolated and (v) is optionally washed and/or dried.

The end of the reaction (ii) can be determined by determining the level of solid or by gas chromatography.

The process of the invention can be carried out starting from a mixture of ethylenically unsaturated monomers. In this case, a random first generation polymer is obtained. By selecting monomers of specific natures and the amount of each of these monomers in the block, a block having specific properties is obtained. This procedure is particularly advantageous when the first generation polymer thus obtained is an intermediate in the preparation of a block copolymer.

The present invention also relates to a process for the preparation of an Nth generation block copolymer by radical polymerization, N being greater than or equal to 2, which comprises:
a first stage of radical polymerization as described above, to form the first generation polymer, followed by
N−1 stages of radical polymerization, each of these stages being carried out from a miniemulsion, as described above, comprising:
at least one ethylenically unsaturated monomer,
the polymer obtained in the preceding radical polymerization stage,
optionally an aqueous solution,
optionally a surfactant, preferably in a low amount, and (ii) the reaction of said emulsion, in the presence of a source of free radicals, at a sufficient temperature and/or for a sufficient time to form polymers, the ethylenically unsaturated monomer or monomers being such that the block formed at this stage is different in nature from the block formed in the preceding stage.

According to one embodiment of the invention, (1) a first generation polymer is synthesized from a miniemulsion and subsequently (2) the first generation polymer obtained in stage (1) is used to prepare a (second generation) diblock copolymer by bringing this first generation polymer into contact, in a miniemulsion, with one or more ethylenically unsaturated monomers and a source of free radicals, the, block obtained in stage (2) being different in nature from the first generation polymer from stage (1).

This stage (2) can be repeated with new monomers and the diblock copolymer obtained to synthesize a new block and to obtain a triblock copolymer.

The polymerization stage can thus be repeated as many times as necessary from a block copolymer in order to obtain a copolymer with an additional block.

The process of the invention thus makes it possible to obtain a diblock copolymer comprising two blocks of formula (III):

Formula (III)

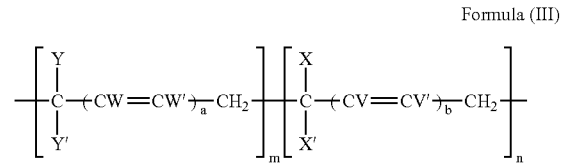

from a miniemulsion comprising:
an ethylenically unsaturated monomer of formula (IIB); CYY'(CW=CW')$_a$=CH$_2$,
a first generation polymer as described above,
n and n', which are identical or different, are greater than or equal to 1,
V, V', W and W', which are identical or different, represent: H, an alkyl group or a halogen,
X, X', Y and Y', which are identical or different, represent H, a halogen or an R, OR, O$_2$COR, NHCOH, OH, NH$_2$, NHR, N(R)$_2$, (R)$_2$N$^+$O$^-$, NHCOR, CO$_2$H, CO$_2$R, CN, CONH$_2$, CONHR or CON(R)$_2$ group, in which R is selected from alkyl, aryl, aralkyl, alkylaryl, alkene or organosilyl groups which are optionally perfluorated and optionally substituted by one or more carboxyl, epoxy, hydroxyl, alkoxy, amino, halogen or sulfo groups, and a and b, which are identical or different, have the value 0 or 1.

The ethylenically unsaturated monomers which are of use are those described above.

According to this process for the preparation of block polymers, when it is desired to obtain block polymers which are homogeneous and not possessing a composition gradient, and if all the successive polymerizations are carried out in the same reactor, it is essential for all the monomers used during one stage to have been consumed before the polymerization of the following stage begins, thus before the new monomers are introduced.

When it is desired to obtain a random block, the polymerization stage is carried out with a composition comprising a mixture of ethylenically unsaturated monomers.

The present invention also relates to the first generation polymers and to the block polymers capable of being obtained according to any one of the processes of the invention. These polymers exhibit a controlled molecular mass.

According to a specific embodiment, the block comprises at least three polymer blocks selected from the following combinations:

polystyrene/polymethylstyrene/polystyrene,
polystyrene/poly(ethyl acrylate)/polystyrene,
polystyrene/poly(butyl acrylate)/polystyrene,
polystyrene/poly(tert-butyl acrylate)/polystyrene,
polystyrene/polyvinylpyridine/polystyrene,
polystyrene/polybutadiene/polystyrene,
polystyrene/polyisoprene/polystyrene,
polyvinyl acetate)/poly(butyl acrylate)/poly(vinyl acetate).

One of the blocks may also be composed of a random copolymer obtained from a mixture of ethylenically unsaturated monomers.

The following example illustrate the invention without however limiting the scope.

EXAMPLE 1

Preparation of a miniemulsion of polystyrene/poly(butyl acrylate)/polystyrene block copolymer in the presence of presence of diethyl meso-2,5-di(O-ethyl xanthate) adipate EtO(C=S)S—C(CO$_2$Et)C$_2$H$_4$(CO$_2$Et)C—S(C=S)OEt.

A solution of sodium dodecyl sulfate (4.73 g; 1.5% by weight with respect to the butyl acrylate) and sodium hydrogenocarbonate (0.15 g) in water (865 g) are introduced in a 5-necked reactor equipped with a reflux condenser, a thermocouple and a mechanical stirrer. The reaction mixture is degassed at ambient temperature by a stream of nitrogen for 30 minutes under stirring (250 rpm) and a solution of diethyl meso-2,5-di(O-ethyl xanthate) adipate (1.43 g; 0.00323 mol) in butyl acrylate (315.0 g) is added. At 70° C., a solution of ammonium persulfate (0.35 g; 50% molar with respect to xanthate) in water (6.5 g) is added. The reaction is maintained at 70° C. for 3 hours. Then, a 57 g sample is withdrawn (first block: Poly(n-butyl acrylate)) and then 0.19 g of ammonium persulfate in 7 g of water are added, at the same time as the addition of 53 g of styrene for 30 minutes is begun. The reaction is halted 2 h 30 min after the end of the introduction of the styrene.

Results:

TABLE 1

| Sample | conv. %$^{a)}$ | Mn $_{GPC}$$^{b)}$ | Mn $_{theor}$$^{c)}$ | Mw/Mn$^{d)}$ | D$_p$ (nm)$^{e)}$ |
|---|---|---|---|---|---|
| First block: Poly(butyl) acrylate | 99 | 134 000 | 98 500 | 6.9 | 94 |
| Block copolymer: Polystyrene/Poly(butyl acrylate)/Polystyrene | 100 | 117 200 | 115 000 | 5.7 | 97 |

$^{a)}$The conversion of the monomers is determined by gas chromatography.
$^{b)}$Number-average molar mass (Mn), measured by gel permeation chromatography (GPC) in THF (polystyrene calibration).
$^{c)}$The theoretical number-average molar mass is determined by the ratio of the initial molar concentrations of the monomer and of the control agent, multiplied by the molar mass of the monomer.
$^{d)}$Polydispersity index = weight-average molar mass (Mw)/number-average molar mass (Mn).
$^{e)}$The diameter of the latex particles and the polydispersity in size of the particles was measured by light scattering (ZetaSizer 1000 from Malvern).

It is found that the value of Mn for the final copolymer is close to the theoretical value. Nevertheless, the value of the polydispersity index is high (equal to 6.7).

EXAMPLE 2

Preparation of a miniemulsion polystyrene-poly(butyl acrylate)/polystyrene block copolymer in the presence of diethyl meso-2,5-di(O-ethyl xanthate)adipate EtO(C=S)S—C(CO$_2$Et) C$_2$H$_4$(CO$_2$Et)C—S(C=S)OEt A solution of sodium dodecyl sulfate (1.56 9; 0.5% by weight with respect to the butyl acrylate), of sodium hydrogenocarbonate (0.2 g) and of initiator 4,4'-azo(4-cyanopentanoic acid) (0.45 g; 50 mol % with respect to the xanthate) in water (540.0 g) is mixed with a solution of diethyl meso-2,5-di(O-ethyl xanthate)adipate (1.43 g; 0.00323 mol) and hexadecane (4.88 g) in n-butyl acrylate (315.0 g). The mixture is subsequently homogenized for 5 minutes by mixing at 24 000 rpm and by subjecting to ultrasound for 5 minutes using a device of the Branson 1200 type.

The pre-miniemulsion prepared according to the method described above is introduced into a 5-necked reactor equipped with a reflux condenser, a thermocouple and a mechanical stirrer. The temperature is set at 70° C. The reaction mixture is stirred at a speed of 250 rpm at for 4 hours. A 40 g sample is subsequently withdrawn from the reaction medium (first block: Poly(n-butyl acrylate)). After this sample has been withdrawn, 0.23 g of 4,4'-azo(4-cyanopentanoic acid) in 10 g of water is introduced at the same time as 0.03 g of sodium hydroxide. 53 g of styrene are then added continuously over 30 minutes. 5 hours after the end of the introduction of the styrene, the reaction is halted by cooling to ambient temperature.

Results:

TABLE 2

| Sample | % conv. | Mn$_{GPC}$ | Mn$_{theor}$ | Mw/Mn | D$_p$ (nm) |
|---|---|---|---|---|---|
| First block: Poly(butyl acrylate) | 97 | 92 400 | 97 700 | 1.95 | 287 |

TABLE 2-continued

| Sample | % conv. | Mn$_{GPC}$ | Mn$_{theor}$ | Mw/Mn | D$_p$ (nm) |
|---|---|---|---|---|---|
| Block copolymer: Polystyrene/ Poly(butyl acrylate)/ Polystyrene | 96 | 90 200 | 114 900 | 2.96 | 295 |

From the results given in table 2, it is apparent that the miniemulsion system makes it possible to considerably reduce the polydispersity index. The distribution in the molecular masses which is obtained is monomodal. Furthermore, the use of GPC double detection (refractometer (RI) and UV at 254 nm) makes it possible to be positive that a triblock copolymer is indeed formed (superposition of the two RI and UV plots).

In addition, the distribution in particle sizes is very narrow: less than 0.01 for the first miniemulsion poly(butyl acrylate) block, 0.03 for the triblock.

EXAMPLE 3

Preparation of a miniemulsion polystyrene-poly(butyl acrylate)/polystyrene block copolymer in the presence of diethyl meso-2,5-di(O-ethyl xanthate)adipate EtO(C=S)S—C(CO$_2$Et)C$_2$H$_4$(CO$_2$Et)C—S (C=S)OEt A solution of sodium dodecyl sulfate (1.56 g; 0.37% by weight with respect to the monomers), of sodium hydrogenocarbonate (0.2 g) and of potassium persulfate (0.39 g; 50 mol % with respect to the control agent) in water (540.0 g) is mixed with a solution of diethyl meso-2,5-di(O-ethyl xanthate)adipate (1.43 g; 0.00323 mol) and of hexadecane (4.88 g) in n-butyl acrylate (315.0 g). The medium is subsequently homogenized for 5 minutes by stirring at 9 500 rpm and then by subjecting to ultrasound for 5 minutes using a device of the Branson 1200 type.

The pre-miniemulsion prepared as described above is charged to a stainless steel reactor. The reaction mixture is subsequently degassed at ambient temperature by a stream of nitrogen with stirring (250 rpm) and then the temperature is brought to 70° C. The mixture is maintained at this temperature for 6 hours. A 40 g sample is then withdrawn (first block: Poly(n-butyl acrylate)), this operation being followed by addition of a solution of initiator (0.20 g) in water (40.0 g). At this point, 110 of styrene are added over 10 minutes. After this addition, the reaction is prolonged for 5 hours and is then cooled to ambient temperature.

Results

TABLE 3

| Sample | % conv. | Mn$_{GPC}$ | Mn$_{theor}$ | Mw/Mn | P. size (nm) |
|---|---|---|---|---|---|
| First block: Poly(butyl acrylate) | 99 | 94 500 | 98 200 | 2.19 | 184 |
| Block copolymer: Polystyrene/ Poly(butyl acrylate)/ Polystyrene | 99 | 128 000 | 131 500 | 3.03 | 193 |

These results show that Mn is fully controlled. RI and UV at 254 nm double detection by GPC confirms the expected triblock structure. In addition, the distribution in particle sizes is narrow (<0.1).

EXAMPLE 4

Preparation of a miniemulsion polystyrene-poly(butyl acrylate)/polystyrene block copolymer in the presence of diethyl meso-2,5-di(O-ethyl xanthate)adipate EtO(C=S)S—C(CO$_2$Et)C$_2$H$_4$(CO$_2$Et)C—S(C=S)OEt A solution of sodium dodecyl sulfate (1.56 g; 0.42% by weight with respect to the monomers), of sodium carbonate (0.3 g) and of potassium persulfate (0.84 g; 50 mol % with respect to the control agent) in water (540.0 g) is mixed with a solution of diethyl meso-2,5-di(O-ethyl xanthate)adipate (3.1 g; 0.007 mol) and of polystyrene (2.25 g, Mn=50 000 g/mol, Mw/Mn=5) in n-butyl acrylate (245.0 g). The medium is subsequently homogenized for 5 minutes by stirring at 24 000 rpm and then by subjecting to ultrasound for 5 minutes using a device of the Branson 1200 type.

The pre-miniemulsion prepared as described above is charged to a stainless steel reactor. The reaction mixture is subsequently degassed at ambient temperature by a stream of nitrogen with stirring (250 rpm) and then the temperature is brought to 70° C. The mixture is maintained at this temperature for 6 hours. A 5 g sample is then withdrawn (first block: Poly(n-butyl acrylate)), this operation being followed by the addition of a solution of initiator (0.42 g) in water (40.0 g). At this point, 115 g of styrene are added over 10 minutes. After this addition, the temperature is brought to 80° C. and the reaction is prolonged for 5 hours and is then cooled to ambient temperature.

TABLE 4

| Sample | % conv. | Mn$_{GPC}$ | Mn$_{theor}$ | Mw/Mn |
|---|---|---|---|---|
| First block: Poly(butyl acrylate) | 99 | 41 500 | 35 400 | 1.56 |
| Block copolymer: Polystyrene/ Poly(butyl acrylate)/ Polystyrene | 99 | 53 500 | 50 400 | 2.25 |

These results show that Mn is fully controlled. RI and UV at 254 nm double detection by GPC confirms the expected triblock structure. In addition, the distribution in particle sizes is very narrow (<0.05).

What is claimed is:

1. A process for the preparation of a Nth generation block copolymer by radical polymerization, N being greater than or equal to 2, which comprises:
   a first stage of radical polymerization, to form the first generation polymer, which comprises:
   (a) the preparation of a mini-emulsion comprising:
   at least one ethylenically unsaturated monomer,
   at least one control agent selected from the group consisting of xanthates, dithiocarbamates, thioetherthiones, xanthates comprising phosphorus and optionally fluorine and dithiophosphoric acid esters,
   an aqueous solution,
   at least one surfactant, and
   a cosurfactant, and (b) the reaction of said mini-emulsion, in the presence of a source of free radicals, at a sufficient temperature and/or for a sufficient time to form polymers, followed by N−1 stages of radical polymerization, each of these stages being carried out from a mini-emulsion, according to the first stage, comprising:
at least one ethylenically unsaturated monomer,
the polymer obtained in the preceding radical polymerization stage,
optionally an aqueous solution, and
optionally a surfactant,
and (ii) the reaction of said emulsion, in the presence of a source of free radicals, at a sufficient temperature and/or for a sufficient time to form polymers, the ethylenically unsaturated monomer or monomers being such that the block formed at this stage is different in nature from the block formed in the preceding stage.

2. The process as claimed in claim 1 for the preparation of a second generation block copolymer, which comprises the radical polymerization of a composition comprising:
at least one ethylenically unsaturated monomer,
a source of free radicals, and
the first generation polymer.

3. The process as claimed in claim 2 for the preparation of a diblock copolymer comprising two blocks of formula (III):

Formula (III)

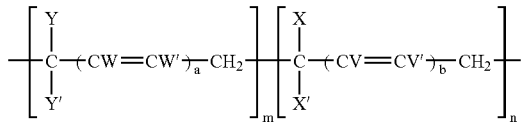

from the mini-emulsion comprising:
an ethylenically unsaturated monomer of formula (IIB): $CYY'(CW=CW')_a=CH_2$,
a first generation polymer,
n and m, which are identical or different, are greater than or equal to 1,
V, V', W and W', which are identical or different, represent H, an alkyl group or a halogen,
X, X', Y and Y', which are identical or different, represent H, a halogen or an R, OR, $O_2COR$, NHCOH, OH, $NH_2$, NHR, $N(R)_2$, $(R)_2N^+O^-$, NHCOR, $CO_2H$, $CO_2R$, CN, $CONH_2$, CONHR or $CON(R)_2$ group, in which R is selected from the group consisting of alkyl, aryl, aralkyl, alkylaryl, alkene and organosilyl groups which are optionally perfluorated and optionally substituted by one or more carboxyl, epoxy, hydroxyl, alkoxy, amino, halogen or sulfo groups, and
a and b, which are identical or different, have the value 0 or 1.

4. The process as claimed in claim 1, wherein the ethylenically unsaturated monomer is selected from the group consisting of styrene and styrene derivatives, vinyl halides, vinyl nitriles and dienes.

5. The process as claimed in claim 1, wherein the control agent is a xanthate compound.

6. The process as claimed in claim 1, wherein the source of free radicals is a radical polymerization initiator selected from the group consisting of hydrogen peroxides, azo compounds and a redox system.

7. The process as claimed in claim 1, wherein the ethylenically unsaturated monomer is a substantially water-insoluble monomer and corresponds to the following formula (I):

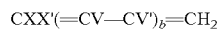

and the first generation polymer obtained comprises n times the unit of formula (II):

formula (II)

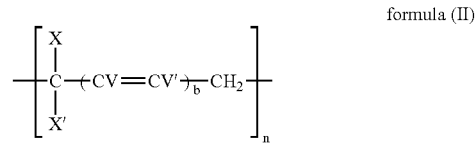

with
n is greater than or equal to 1,
V and V', which are identical or different, represent a hydrogen atom, an alkyl group or a halogen,
X and X', which are identical or different, represent H, a halogen or an R, OR, $O_2COR$, NHCOH, OH, $NH_2$, NHR, $N(R)_2$, $(R)_2N^+O^{3I}$, NHCOR, $CO_2H$, $CO_2R$, CN, $CONH_2$, CONHR or $CON(R)_2$ group, in which R is selected from the group consisting of alkyl, aryl, aralkyl, alkylaryl, alkene and organosilyl groups which are optionally perfluorated and optionally substituted by one or more carboxyl, epoxy, hydroxyl, alkoxy, amino, halogen or sulfo groups, and
b is 0 or 1.

8. The process as claimed in claim 1, wherein the surfactant is an anionic surfactant.

9. The process as claimed in claim 8, wherein the anionic surfactant is selected from the group consisting of alkylarylsulfonates, alkali metal alkyl sulfates, sulfonated alkyl esters, fatty acid esters and fatty acid salts.

10. The process as claimed in claim 1, wherein the cosurfactant is a long chain $C_{10}$-$C_{40}$ hydrocarbonaceous compound selected from the group consisting of alcohols, alkanes, mercaptans, carboxylic acids, ketones, amines, polymers and mixtures thereof.

11. The process as claimed in claim 1, wherein the amount of surfactants is between approximately 0.02 and 8.0% by weight, with respect to the total weight of ethylenically unsaturated monomers.

12. The process as claimed in claim 1, wherein the amount by weight of cosurfactant with respect to the ethylenically unsaturated monomer according to the process is between 0.01 and 5%.

13. The process as claimed in claim 1, wherein the molar ratio of cosurfactant to surfactant is between 0.001 and 10.

14. The process as claimed in claim 1, wherein the amount of surfactants is between 0.4 and 2% by weight with respect to the total weight of ethylenically unsaturated monomers.

15. The process as claimed in claim 1, wherein the amount of dry matter at the end of the process is between 10 and 65% by weight, with respect to the total weight of the mini-emulsion.

16. The process as claimed in claim 1, wherein the temperature of the reaction (ii) varies between 40° C. and 200° C.

* * * * *